March 25, 1958 D. E. WIEGAND 2,828,368

MAGNETIC REPRODUCTION SYSTEM

Filed May 25, 1955

Inventor
DAVID E. WIEGAND by Hill, Sherman, Meroni, Gross & Simpson Attys.

United States Patent Office 2,828,368

Patented Mar. 25, 1958

2,828,368

MAGNETIC REPRODUCTION SYSTEM

David E. Wiegand, Villa Park, Ill., assignor to Armour Research Foundation of Illinois Institute of Technology, Chicago, Ill., a corporation of Illinois Application May 25, 1955, Serial No. 511,087

2 Claims. (Cl. 179—100.2)

Figures 1, 2:
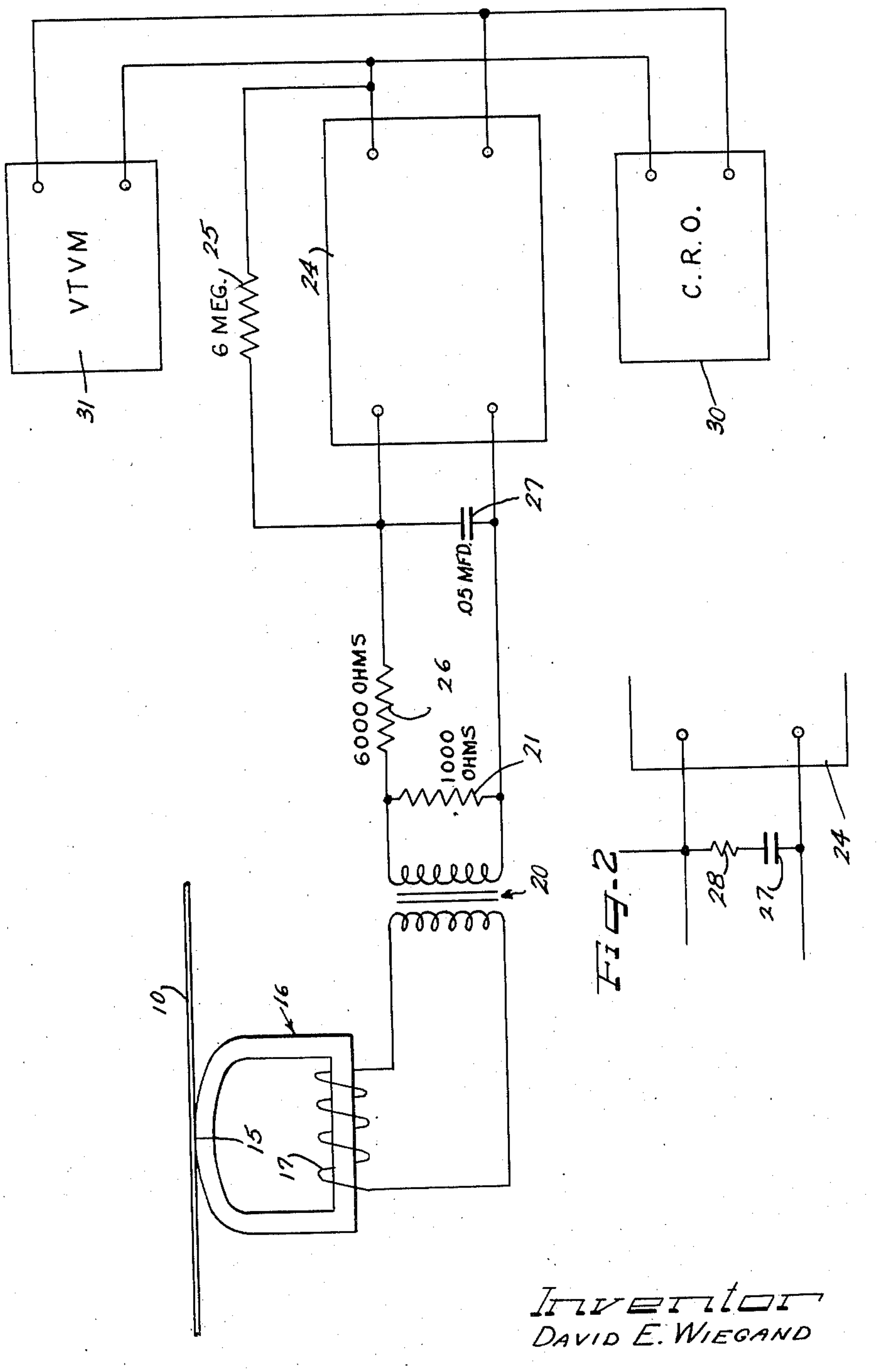

This invention relates to a magnetic reproduction system, and particularly to a novel means for providing a linear output from a system including a magnetic transducer responding to the time derivative of an input magnetic signal flux.

In instrument applications, it is often desirable to obtain an output varying linearly with a signal magnetically recorded on a record medium. In conventional practice, such linear output would be obtained by amplifying the signal induced in the playback coil of a conventional playback head and feeding the amplified signal into a conventional integrating circuit and then further amplifying the signal. However, according to the present invention, it has been found possible to obtain a linear output from a conventional playback head with an important reduction in the number of amplification stages required.

It is therefore an object of the present invention to provide an especially economical and simple method and means for obtaining a linear output from a conventional induction type playback head.

It is a further object of the present invention to provide a novel linear magnetic reproduction system.

Other objects, features and advantages of the present invention will be apparent from the following detailed description taken in connection with the accompanying sheet of drawings, in which:

Figure 1 represents diagrammatically a magnetic reproduction system in accordance with the present invention; and Figure 2 illustrats a modification in the circuit of Figure 1.

As shown on the drawings:

In the drawings, the reference numeral 10 indicates a record medium having a signal magnetically recorded thereon, the waveform of which is to be substantially linearly reproduced by the system including induction type playback head 16. To this end, the record medium 10 passes over a playback gap 15 of the magnetic playback head 16 in such manner as to induce a signal voltage in the playback coil 17 of the head. The signal from the head is fed to a coupling transformer 20 whose secondary may be provided with a shunt resistance 21, and then to a conventional linear, negative feedback amplifier 24 such as the Ballantine Decade Amplifier, Model No. 220, having a gain of 100.

It has been found that a linear output can be obtained from the amplifier 24 by providing a positive feedback circuit externally of the amplifier including for example, a resistance 25, and a resistance 26 and capacitance 27 in parallel across the input to the amplifier, and by delivering the output from the head directly to an integrating circuit including the resistance 26 and the capacitance 27 in series without any pre-amplification of the signal energy. In some cases, it may be desirable to provide a resistance such as indicated at 28 in Figure 2 in series with the condenser 27 to provide a certain amount of high frequency boost.

In a circuit according to the illustrated embodiment, it was found that the critical value of resistance 26 to just obtain oscillation of amplifier 24 was 9410 ohms. A value of resistance well below this critical value is desirable in order to insure stability. The output from the amplifier 24 is indicated as being observed by means of a cathode ray oscilloscope 30 and a vacuum tube voltmeter 31.

With the illustrated arrangement, it is found that the signal energy is not lost in the integrating circuit as would be expected. On the contrary, the energy output from the amplifier 24 is comparable to that which would be obtained with a conventional integrating arrangement having several stages of amplification ahead of an integrating circuit and an amplifier comparable to amplifier 24 connected to the output of the integrating circuit. Further, such a conventional integrating arrangement is inferior to the illustrated arrangement with respect to linearity and stability of output.

A system is considered substantially distortionless or substantially linear for the purposes of this specification if the output is linear with respect to the input to the head 16 within about 10%.

While I have described my invention in connection with a specific embodiment thereof, it should be distinctly understood that this description is made merely by way of illustration and it is not to be construed as any limitation of the scope thereof.

Furthermore, while I have described a particular linear amplifier arrangement, it is clear that any suitable amplifier system with the required degree of linearity may be substituted, it being merely necessary to care for the differing characteristics thereof by suitably modifying the circuit. Furthermore, many other circuits and designs not specifically discussed, for accomplishing the results in accordance with my invention, will occur to those skilled in the art. What I consider to be my invention and upon which I desire to secure protection is embodied in the accompanying claims.

I claim as my invention:

1. In combination, a magnetic reproduction system comprising a magnetic playback head having an induction coil for generating a voltage which is a function of the time derivative of a signal flux linking said head, an integrating circuit connected with said coil, a substantially linear amplifier connected to the output of said integrating circuit, and a positive feedback circuit connected to the output of said amplifier and including said integrating circuit.

2. In combination, a magnetic reproduction system comprising an induction type pickup device for developing a voltage varying in accordance with the time derivative of an input signal, an integrating circuit connected with the output of said induction device including series resistance means and capacitance means, linear amplifier means having an input connected across said capacitance means, and a positive feedback circuit element connected to the output of said amplifier means and connected to said integrating circuit between said resistance means and said capacitance means.

References Cited in the file of this patent

UNITED STATES PATENTS 2,649,506 Gayford ............... Aug. 18, 1953